UNITED STATES PATENT OFFICE.

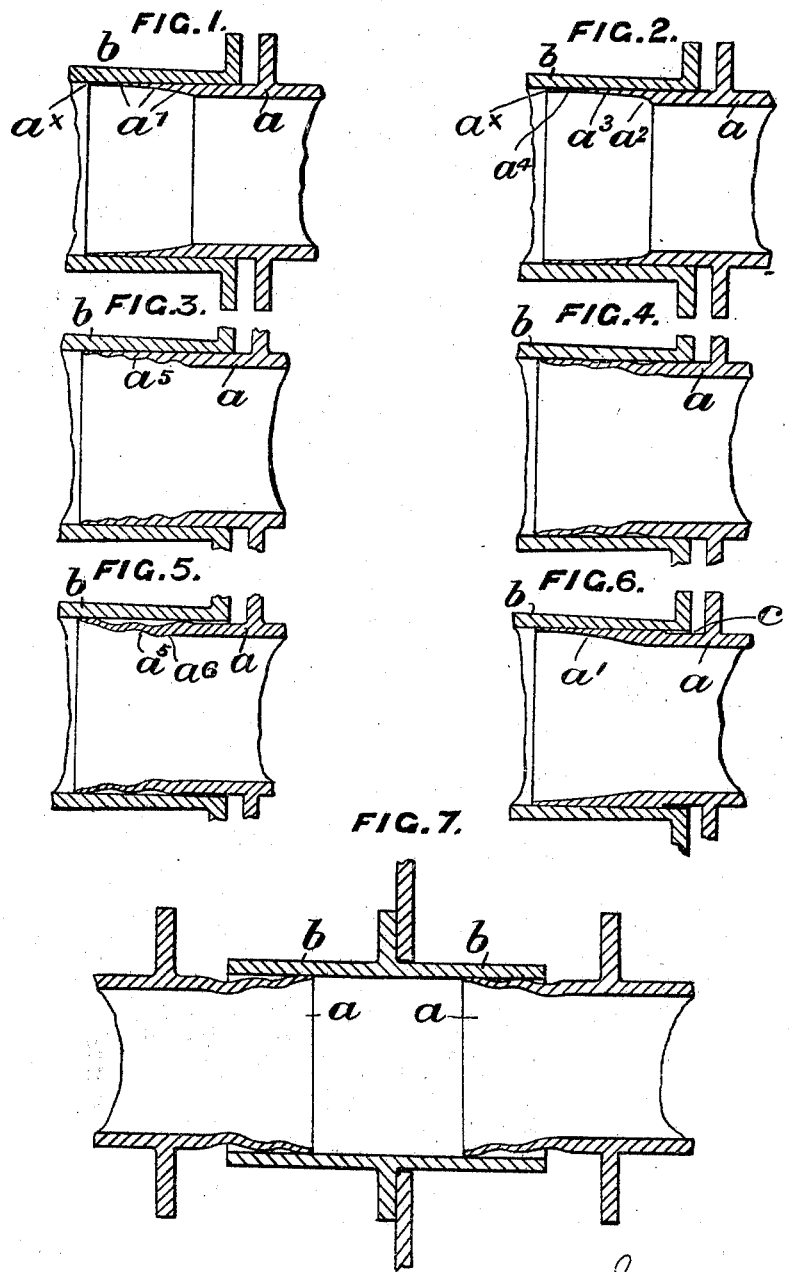

THOMAS DREWRY, OF FOREST GATE, ENGLAND, ASSIGNOR TO J. STONE AND COMPANY LIMITED, OF DEPTFORD, ENGLAND.

EXPANSION-JOINT.

1,302,778.  Specification of Letters Patent.  Patented May 6, 1919.

Application filed July 31, 1918. Serial No. 247,561.

*To all whom it may concern:*

Be it known that I, THOMAS DREWRY, a subject of the King of Great Britain, of 58 Claremont road, Forest Gate, in the county of Essex, England, have invented certain new and useful Improvements in and Relating to Expansion-Joints, of which the following is a specification.

This invention refers to improvements in and relating to expansion joints for piping. The joints concerned are of the simple or balanced type comprising internal and external sleeves adapted to slide telescopically and liquid or fluid-tight in relation to each other, the internal sleeve or sleeves being made internally taper to afford a certain degree of elasticity and so that the pressure of the fluid, will cause the tapered part to expand into contact with the inner surface of the female member or outer sleeve and produce a tight joint, notwithstanding axial or other movement of the piping due to expansion or contraction of the metal of which the piping is made. In joints of this kind hitherto proposed the tapering of the inner sleeve has been uniform and the end portion has been made relatively thin.

One of the principal objects of this invention is to produce an improved joint of this type which requires no packing and which obviates distortion of, or racking strains in, the pipes, due not only to unequal expansion or contraction, but also, on occasion, to vibration.

According to this invention, the taper of the inner sleeve or spigot is made curved and non-uniform for the whole or a material part of its length instead of being uniform, or straight. The end of the spigot is in some cases materially reduced by the curved or non-uniform taper and is then given a uniform or straight taper. The curved tapering is suitably in the form of a parabolic or similar curve. Or the taper may be straight or uniform near the end of the sleeve or from about midway of the taper portion to the end, the rest of the taper being in the form of a parabolic or other suitable curve. Or the interior of the taper portion of the inner sleeve or spigot is of corrugated formation or the corrugations are both internal and external. With an inner sleeve of any of the constructions before referred to, the sleeve may be made of slightly reduced diameter externally and except in the region of the internally tapered end portion so that, in practice, only this portion, or a part thereof is in intimate contact with the outer sleeve. Such reduction in diameter may, however, if desired extend a short distance beyond the region of the taper part.

In order that the invention may be readily understood reference is made to the accompanying drawings in which:—

Figure 1 is a longitudinal section of an expansion joint constructed according to this invention.

Figs. 2, 3, 4, 5, 6 and 7 are similar views of other constructions or modifications.

In carrying the invention into effect and according to one construction, seen in Fig. 1, $a$ and $b$ are the telescopic joint sleeves and the internal taper of the inner sleeve $a$ is formed by a slight curve $a^1$, the extremity of the sleeve $a$ being thin and square at the end $a^x$ or rounded off or chamfered internally.

According to another modification and as shown in Fig. 2 the commencement of the taper is formed by a curve $a^2$ of relatively short radius or radii, the said curve merging into another curve $a^3$ produced by much longer radii and extending to about the middle of the length of the taper which is then uniform or straight at $a^4$ till it reaches the thin end $a^x$.

Or, as shown in Fig. 3, the whole of the taper is formed of a succession of internal undulations or corrugations $a^5$ which are uniform or gradually reduced in cross section toward the end of the inner sleeve $a$.

Or, according to the construction shown in Fig. 4 the corrugations at or toward the end of the inner sleeve $a$ are both internal and external. Preferably, and as seen in Fig. 5, one or more of these corrugations $a^5$ and $a^6$ is or are externally of slightly smaller diameter than that of the end portion of the inner sleeve fitting within the outer sleeve $b$.

Moreover, and in order to obviate distortion or racking strains in the pipes which may be due to unequal expansion, contraction and vibration or to any of these, the inner sleeve $a$ of any of the constructions, hereinbefore referred to, may be externally of a slightly reduced diameter, as at $c$ Fig. 6, except in the region of its internally tapered end $a^1$, so that only the exterior of the taper portion, or a part thereof, is in contact with or fits in the outer sleeve b. A very small amount of clearance suffices, say $\frac{5}{1000}$ of an inch.

Fig. 7 shows two sleeves a fitting within a double-ended sleeve b, the corrugated formation of the tapered portions being similar to that seen in Fig. 5 and the sleeves a being externally of smaller diameter than the internal diameter of the sleeve b.

I claim:—

1. Expansion telescopic joint for pipes comprising a tapered inner sleeve portion adapted to be distended by fluid pressure into contact with the outer sleeve, the inner sleeve portion being tapered non-uniformly and so as to give its inner surface a curvature for a material part of its length substantially as set forth.

2. Expansion telescopic joint for pipes comprising a tapered inner sleeve portion adapted to be distended by fluid pressure into contact with the outer sleeve, the inner sleeve portion being tapered non-uniformly and so as to give its inner surface an irregular curvature composed of several different curves substantially as set forth.

3. Expansion telescopic joint for pipes comprising a tapered inner sleeve portion adapted to be distended by fluid pressure into contact with the outer sleeve, the inner portion being tapered partly by a straight and partly by a curved taper substantially as set forth.

4. Expansion telescopic joint for pipes comprising a tapered inner sleeve portion adapted to be distended by fluid pressure into contact with the outer sleeve, the inner portion being tapered non-uniformly and so as to give its inner surface a succession of undulations or curves substantially as set forth.

5. Expansion telescopic joint for pipes comprising a tapered inner sleeve portion adapted to be distended by fluid pressure into contact with the outer sleeve, the inner sleeve portion being tapered non-uniformly and so as to give its inner surface a curved formation for a material part of its length the non-distending portion of the tapered sleeve having an external diameter smaller than the internal diameter of the outer sleeve substantially set forth.

THOMAS DREWRY.

Copies of this patent may be obtained for five cents each, by addressing the "Commissioner of Patents, Washington, D. C."